United States Patent
Melia et al.

(10) Patent No.: US 9,030,994 B2
(45) Date of Patent: May 12, 2015

(54) INITIALIZING A COMMUNICATION BETWEEN A MOBILE HOST AND A CORRESPONDENT NODE

(75) Inventors: Telemaco Melia, Nozay (FR); Yacine El Mghazli, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 279 days.

(21) Appl. No.: 13/379,925

(22) PCT Filed: Jun. 18, 2010

(86) PCT No.: PCT/EP2010/058661
§ 371 (c)(1),
(2), (4) Date: Mar. 19, 2012

(87) PCT Pub. No.: WO2010/149594
PCT Pub. Date: Dec. 29, 2010

(65) Prior Publication Data
US 2012/0207090 A1  Aug. 16, 2012

(30) Foreign Application Priority Data
Jun. 22, 2009  (EP) .................................... 09163413

(51) Int. Cl.
*H04W 4/00*  (2009.01)
*H04W 60/00*  (2009.01)
*H04W 80/04*  (2009.01)
*H04W 88/06*  (2009.01)
*H04W 88/18*  (2009.01)

(52) U.S. Cl.
CPC ............ *H04W 60/005* (2013.01); *H04W 60/00* (2013.01); *H04W 80/04* (2013.01); *H04W 88/06* (2013.01); *H04W 88/182* (2013.01)

(58) Field of Classification Search
CPC ..................................................... H04W 60/00
USPC ................. 370/328–339, 310, 465–473, 401; 455/403, 414
See application file for complete search history.

(56) References Cited

U.S. PATENT DOCUMENTS

| | | | |
|---|---|---|---|
| 2004/0029555 A1* | 2/2004 | Tsai et al. ...................... | 455/403 |
| 2009/0122750 A1* | 5/2009 | Sarikaya ........................ | 370/328 |

OTHER PUBLICATIONS

Multiple interfaces in NetLMM, NetLMM Working Group, M. Jeyatharan et al. Oct. 29, 2008, pp. are 1-39.*

(Continued)

*Primary Examiner* — Iqbal Zaidi
(74) *Attorney, Agent, or Firm* — Fay Sharpe LLP

(57) ABSTRACT

Embodiments of the present invention relate to a router able to cooperate with a mobile host of a home network for initializing a communication between said mobile host and a correspondent node over at least a first and a second networks, said mobile host comprising at least a first and a second network interfaces able to connect respectively to said first and second networks, said router being further able to:
attach the mobile host to said second network;
receive a request for a communication address;
transmit a communication address to said mobile host; and
configure said mobile host with a predefined model indicator for enabling said mobile host to receive through its second network interface some data sent by the correspondent node towards the first network interface.

Embodiments of the invention also relate to a mobile host with which the router cooperates.

14 Claims, 6 Drawing Sheets

(56) References Cited

OTHER PUBLICATIONS

Jeyatharan C NG Panasonic V Devarapalli Wichorus J Hirano Panasonic M, "Multiple Interfaced Mobile Nodes in NetLMM; draft-jeyatharan-netlmm-multi-interface-ps-03.txt," Internet Engineering Task Force, XP015059248, pp. 1-39, Oct. 29, 2008.

Jeyatharan C NG Panasonic M, "Multihoming Problem Statement in NetLMM; draft-jeyatharan-netext-multihoming-ps-01.txt," Internet Engineering Task Force, XP015061434, pp. 1-16, Mar. 9, 2009.
International Search Report for PCT/EP2010/058661 dated Jul. 23, 2010.

\* cited by examiner

INITIALIZING A COMMUNICATION BETWEEN A MOBILE HOST AND A CORRESPONDENT NODE

CROSS-REFERENCE TO RELATED APPLICATIONS

This application is based on European Patent Application No. 09163413,9 filed Jun. 22, 2009, the disclosure of which is hereby incorporated by reference thereto in its entirety, and the priority of which is hereby claimed under 35 U.S.C. §119.

FIELD OF THE INVENTION

Embodiments of the present invention relate to a router able to cooperate with a mobile host of a home network for initializing a communication between said mobile host and a correspondent node over at least a first and a second networks. Embodiments of the invention also relate to a mobile host of a home network able to cooperate with said router for initializing a communication with a correspondent node over at least a first and a second networks.

Such a router and mobile host may be used in any networks system, such as, but not exclusively, a networks system using a proxy mobile IP protocol.

BACKGROUND OF THE INVENTION

A router able to cooperate with a mobile host of a home network for initializing a communication with a correspondent node over at least a first and a second networks, well-known by the man skilled in the art, is able to:
Send some first data towards the first network using a first IP address;
Send some second data towards the second network using a first IP address.

The mobile host of a home network able to cooperate with said router for initializing a communication with a correspondent node over at least a first and a second networks, well-known by the man skilled in the art, is able to:
Receive some first data through the first network by means of a first network interface to which the first IP address is associated, said first network interface being able to connect to said first network.
Receive some second data through the first network by means of a second network interface to which the first IP address is associated, said second network interface being able to connect to said second network.

One problem of this prior art is that the router and the mobile host are not able to perform a network load balancing between the two networks, that is to soya balanced transmission of the data between the two networks (in case there is a network which has a bottleneck in a not limited example) especially when the mobile host is able to perform a multi-homing function which is the reception/transmission of data simultaneously across its interfaces.

SUMMARY OF THE INVENTION

It is an object of embodiments of the invention to provide a router able to cooperate with a mobile host of a home network for initializing a communication between said mobile host and a correspondent node over at least a first and a second networks, which solves the problem mentioned above.

To this end, there is provided a router able to cooperate with a mobile host of a home network for initializing a communication between said mobile host and a correspondent node over at least a first and a second networks, said mobile host comprising at least a first and a second network interfaces able to connect respectively to said first and second networks, said router being further able to:
Attach the mobile host to said second network;
Receive a request for a communication address;
Transmit a communication address to said mobile host; and
Configure said mobile host with a predefined model indicator for enabling said mobile host to receive through its second network interface some data sent by the correspondent node towards the first network interface.

As we will see in further details, thank to said configuration, such a router permits a mobile host to receive some data which are bound to a specified network (and therefore to the network interface of a mobile host which is able to connect to said specified network) through another network associated to another network interface of the mobile host.

In a first not limited embodiment, the router is further able to receive an instruction of configuration of said mobile host from a home agent of the home network. Hence, by controlling the configuration, a home agent may decide to perform some load balancing or not.

In a second not limited embodiment, the router is further able to create a corresponding entry in a binding table between a home agent of the home network and the mobile host. It permits to bind a router to a mobile host. The home agent knows to which router it has to transfer the data destined to the mobile host.

In a third not limited embodiment, the router is further able to perform the step of transmitting a communication address and the step of configuring said mobile host altogether. It is a simply solution.

In a fourth not limited embodiment, the router uses a proxy mobile IP protocol. It avoids modifying a mobile host to perform some multi-homing function and moreover some load-balancing function.

In a fifth not limited embodiment, the router is a mobility access gateway and the home agent with which it is able to cooperate is a local mobility anchor.

In a sixth not limited embodiment, the predefined model indicator defines a weak host model. It permits a mobile host to receive some data onto a different interface to which said data were destined to.

In a seventh not limited embodiment, the router uses a router advertisement request to perform the step of configuring said mobile host with a predefined model indicator. By using a standard request, it avoids implementing a proprietary request for the configuration.

In addition, there is provided a mobile host of a home network able to cooperate with a router for initializing a communication with a correspondent node over at least a first and a second networks, said mobile host comprising at least a first and a second network interfaces able to connect respectively to said first and second networks, said mobile host being further able to:
Attach to said second network;
Request for a communication address;
Receive a communication address; and
Be configured with a predefined model indicator for enabling the receiving through its second network interface of some data sent by the correspondent node towards the first network interface.

In a first not limited embodiment, the mobile host is further able to set up said communication address with a second destination address associated with the second network interface. It permits to connect an interface of the mobile host to the second network.

In a second not limited embodiment, the mobile host uses a proxy mobile IP protocol.

In a third not limited embodiment, the predefined model indicator defines a weak host model.

In addition, there is provided a networks system for initializing a communication between a mobile host of a home network and a correspondent node over at least a first and a second networks by way of a router, said mobile host comprising at least a first and a second network interfaces able to connect respectively to said first and second networks, said networks system comprising:
- a router according to any one of the previous characteristics; and
- a mobile host according to any one of the previous characteristics.

In addition, there is provided a first method for initializing a communication between a mobile host of a home network and a correspondent node over at least a first and a second networks, said mobile host comprising at least a first and a second network interfaces able to connect respectively to said first and second networks, said method comprising the steps of:
- Attaching the mobile host to said second network;
- Receiving a request for a communication address;
- Transmitting a communication address to said mobile host; and
- Configuring said mobile host with a predefined model indicator for enabling said mobile host to receive through its second network interface some data sent by the correspondent node towards the first network interface.

In addition, there is provided a second method for initializing a communication with a correspondent node over at least a first and a second networks, said mobile host comprising at least a first and a second network interfaces able to connect respectively to said first and second networks, said method comprising the steps of:
- Attach to said first network;
- Request for a communication address;
- Receive a communication address; and
- Be configured with a predefined model indicator for enabling the receiving through its second network interface of some data sent by the correspondent node towards the first network interface.

In addition, there is provided a computer program product for a computer, comprising a set of instructions, which when loaded into said computer, causes the computer to carry out the first method as characterized above.

In addition, there is provided a computer program product for a computer, comprising a set of instructions, which when loaded into said computer, causes the computer to carry out the second method as characterized above.

BRIEF DESCRIPTION OF THE FIGURES

Some embodiments of methods and/or apparatus in accordance with embodiments of the present invention are now described, by way of example only, and with reference to the accompanying drawings, in which.

DESCRIPTION OF EMBODIMENTS OF THE INVENTION

In the following description, well-known functions or constructions by the man skilled in the art are not described in detail since they would obscure the invention in unnecessary detail.

Embodiments of the present invention relate to a router MAG2 able to cooperate with a mobile host MN of a home network NTWH for initializing a communication between said mobile host MN and a correspondent node CN over at least a first and a second network NTW1, NTW2, said mobile host MN comprising at least a first and a second network interfaces IF1, IF2 able to connect respectively to said first and second network NTW1, NTW2.

It relates also to a mobile host MN of a home network NTWH able to cooperate with a router MAG2 for initializing a communication with a correspondent node CN over at least a first and a second network NTW1. NTW2, said mobile host MN comprising at least a first and a second network interfaces IF1, IF2 able to connect respectively to said first and second networks NTW1, NTW2.

Such a router MAG2 and such a mobile host MN are comprised within a networks system N.

Figure 1:
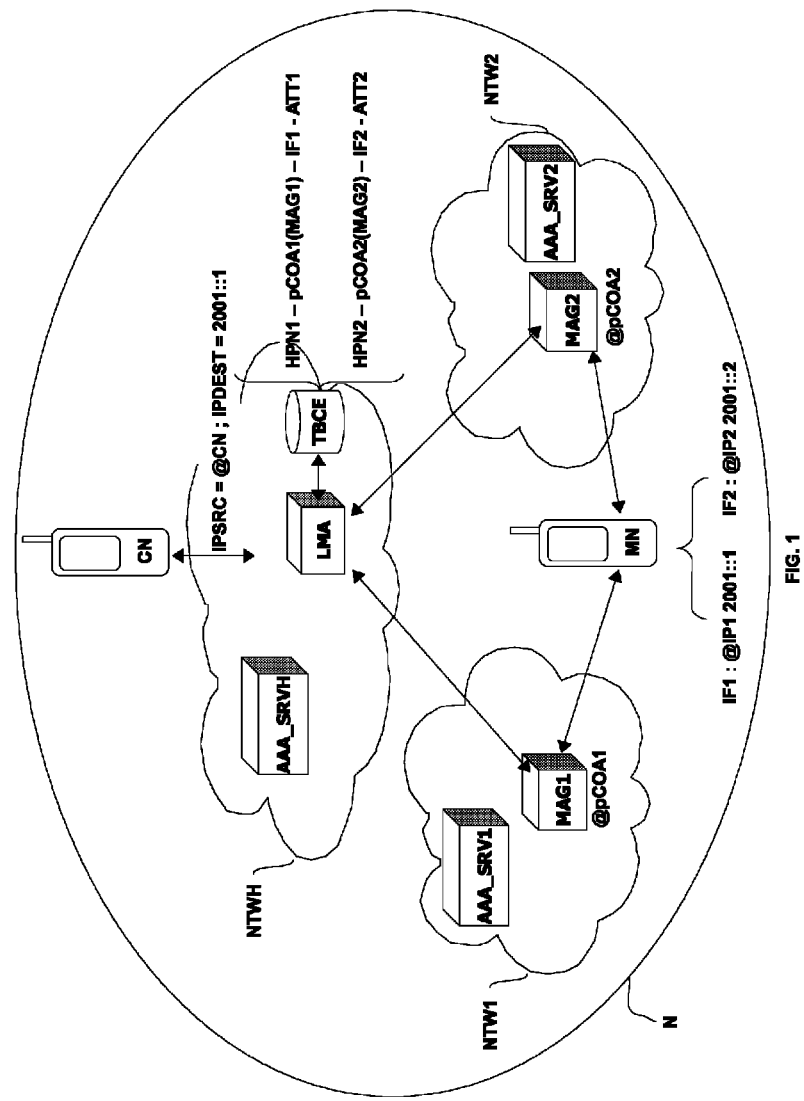
FIG. 1 illustrates a schematic networks system comprising a plurality of router and a mobile host according to embodiments of the invention.

As illustrated in the not limited schematic example of FIG. 1, a networks system N comprises:
- A home network NTWH to which the mobile host MN is associated, said home agent NTW comprising:
  - a home agent LMA for attributing communication addresses to mobile hosts MN;
  - a home server AAA_SRVH for authentication of a mobile host MN within said home network NTWH;
- A first network NTW1 comprising:
  - At least one first router MAG1;
  - a first server AAA_SRV1 for authentication of a mobile host MN within said visited network NTW1;
- A second network NTW2 comprising:
  - At least one second router MAG2;
  - a second server AAA_SRV2 for authentication of a mobile host MN within said visited network NTW2;
- A correspondent node CN which is able to communicate with the mobile host MN across the first NTW1 and/or second networks NTW2.

The first and second network NTW1, NTW2 are networks which may be visited by the mobile host MN.

The routers MAG1 and MAG2 are able respectively to:
- Offers connectivity to the mobile host MN for the first network interface IF1 over the first network NTW1 and routes data to/from the correspondent node CN using said first interface IF1;
- Offers connectivity to the mobile host MN for the second network interface IF2 over the second network NTW2 and routes data to/from the correspondent node CN using said first interface IF2.

Figure 2:
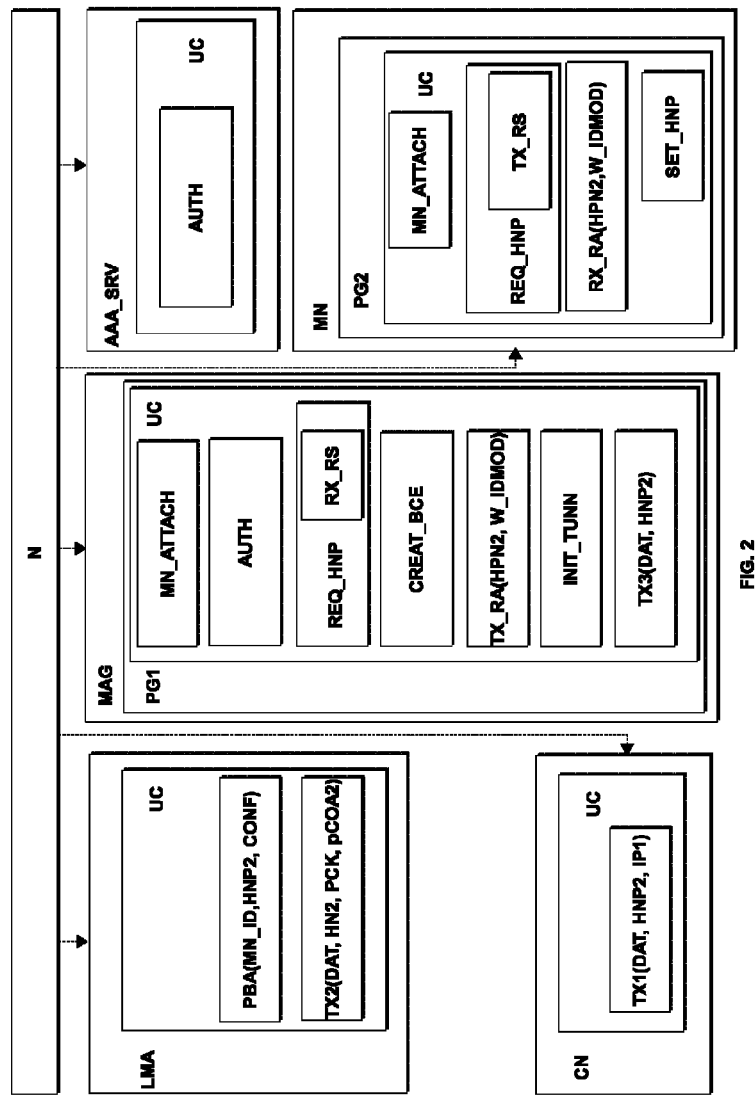
FIG. 2 illustrates schematically in more details according to a first not limited embodiment a router, a mobile host and other elements of the networks system of FIG. 1.
Figure 4:
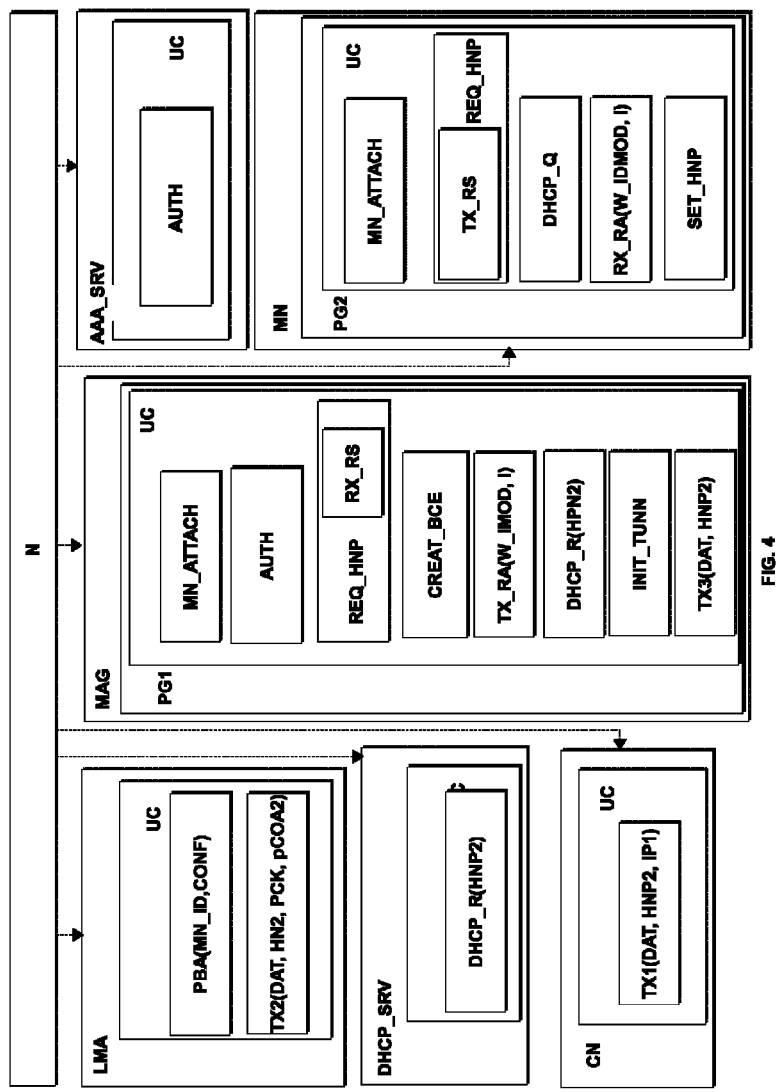
FIG. 4 illustrates schematically in more details according to a second not limited embodiment a router, a mobile host and other elements of the networks system of FIG. 1.

As illustrated in the not limited embodiments of FIG. 2 and FIG. 4, a router MAG is further able to:

Attach the mobile host MN to said second network NTW2 (function MN_ATTACH as illustrated in FIG. 2 and FIG. 4);

Receive a request for a communication address HNP (function REQ_HNP as illustrated in FIG. 2 and FIG. 4);

Transmit a communication address HNP to said mobile host MN (function TX_RA(HNP2, W_IMOD) as illustrated in FIG. 2; function DHCP_R(HNP2)) as illustrated in FIG. 4; and Configure said mobile host MN with a predefined model indicator W_IMOD for enabling said mobile host MN to receive through its second network interface IF2 some data DAT sent by the correspondent node CN towards the first network interface IF1 (function TX_RA(HNP2; W_IMOD) as illustrated in FIG. 2; function TX_RA (W_IMOD) as illustrated in FIG. 4).

In a not limited embodiment, the router MAG is further able to receive an instruction of configuration of said mobile host MN from a home agent LMA of the home network NTWH (function PBA(MN_ID, HNP2, CONF) as illustrated in FIG. 2; function PBA(MN_ID, HNP2, CONF) as illustrated in FIG. 4).

In a not limited embodiment, the router MAG is further able to create a corresponding entry in a binding table TBCE between a home agent LMA of the home network NTWH and the mobile host MN (function CREAT_BCE as illustrated in FIG. 2 and FIG. 4).

In a not limited embodiment, the router MAG is further able to cooperate with an authentication server AAA_SRV to perform an authentication of a mobile host MN (function AUTH as illustrated in FIG. 2 and FIG. 4).

In a not limited example, a router MAG comprises a unit control UC which is able to perform these above-functions.

As illustrated in FIG. 2 and FIG. 4, a mobile host MN is able to:

Attach to said second network NTW2 (function MN_ATTACH as illustrated in FIG. 2 and FIG. 4);

Request for a communication address HNP (function REQ_HNP as illustrated in FIG. 2 and FIG. 4);

Receive a communication address HNP (function RX_RA (HNP2, W_IMOD) as illustrated in FIG. 2 ; function DHCP_R(HNP2) as illustrated in FIG. 4); and Be configured with a predefined model indicator W_IMOD for enabling the receiving through its second network interface IF2 of some data DAT sent by the correspondent node CN towards the first network interface IF1 (function RX_RA(HNP2; W_IMOD) as illustrated in FIG. 2; function RX_RA(W_IMOD) as illustrated in FIG. 4).

In a not limited embodiment, the mobile host MN is further able to set up said communication address HNP with a first destination address IP1 associated with the first network interface IF1 (function SET_HNP as illustrated in FIG. 2 and in FIG. 4).

In a not limited example, a mobile host MN comprises a unit control UC which is able to perform these above-functions.

In order to perform these above-mentioned functions, in a not limited embodiment, the routers MAG and the mobile host MN used a proxy mobile IP protocol.

This protocol permits to manage the mobility of a mobile host MN across different networks NTW.

Contrary to a mobile IP protocol, called MIP which manages said mobility within said mobile host itself MN, a proxy mobile IP protocol, called PMIP, permits to:

manage the mobility of a mobile host MN across different visited networks NTW1, NTW2;

Hence, it doesn't require any modifications to the mobile host MN for the management of the mobility;

From the point of view of the mobile host MN, the connection to the different networks visited appears as a connection to the home network NTWH as will be understood hereinafter.

In this embodiment, a router MAG is a mobile access gateway, the home agent LMA with which a router MAG is able to cooperate is a local mobility anchor, the mobile host MN is a mobile node and the binding table TBCE is a binding update list entry.

Figure 5:
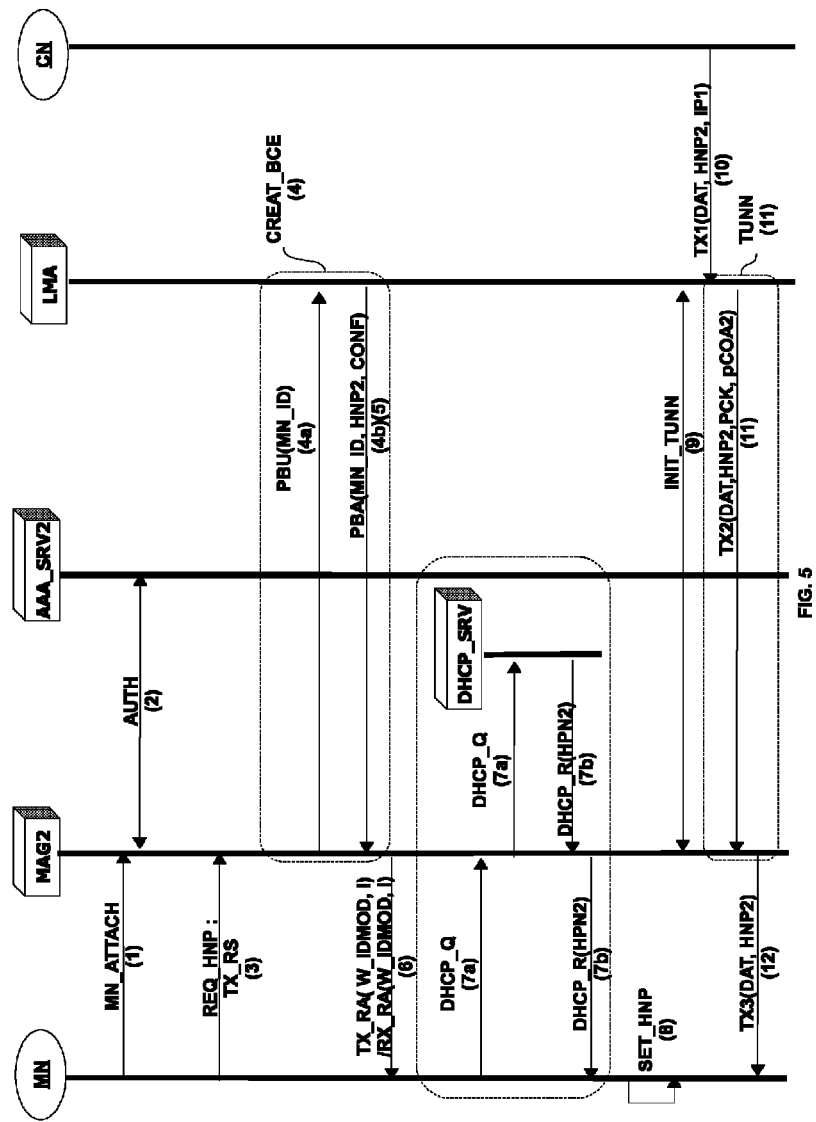
FIG. 5 illustrates schematically data exchange between a router and said mobile host of FIG. 4.

A router MAG2 and a mobile host MN cooperate together for initializing a communication between said mobile host MN and a correspondent node CN, as following as illustrated in not limited embodiments in FIG. 4 and FIG. 5.

It is to be noted that a communication initialized by way of the second router MAG2 is taken into a not limited example.

In the following, in the not limited example of the communication described, the router MAG2 and the mobile host MN comprise the further embodiments above-mentioned.

The following not limited example is taken:

A mobile host MN which:
has already connects its first interface IF1 to the first network NTW1; and
is entering into the second network NTW2.

The two network interfaces IF1 and IF2 have respectively the IP address @IP1=2001::1 and @IP2=2001::2.

A first access technology type ATT1 is used within the first network NTW1 and a second access technology type ATT2 is used within the second network NTW2. For example, the first technology is WI-FI® and the second technology is 3GPP. In another example, the first technology is LTE ("Long Term Evolution") and the second technology is Wimax® "Worldwide Interoperability for Microwave Access").

the correspondent node CN has an IP address @CN.

the first router MAG1 and the second router MAG2 have respectively a proxy care of address pCOA1 and pCOA2.

In the following, reference to FIG. 3 to FIG. 5 will be made.

In a first step 1), when the mobile host MN is under the coverage of the second network NTW2 and wants to connect its second network interface IF2 to said second network NTW2, the mobile host MN attaches to said second network NTW2 (step MN_ATTACH). The attachment is performed by the router MAG2.

It is to be noted that, in not limited examples, the mobile host MN wants to connect to the second network NTW2:

When it enters under the coverage of said network NTW2; or

When it is under the coverage of the two networks NTW1 and NTW2 and it is already connected to the first network NTW1, but it loses the connection to the first network NTW1.

The attachment enables to establish a connection of the mobile host MN with the second network NTW2.

In a second step 2), an authentication of said mobile host MN is performed (step AUTH).

This authentication step is performed by the router MAG2 which gets from an authentication server AAA_SRV (of the visited network NTW2 or of the home network NTWH) a mobile host identifier MN_ID. In the not limited example given, the authentication server AAA_SRV of the second visited network NTW2 is used.

It is to be noted that in a not limited embodiment, an authentication server AAA_SRV is an AAA server ("Authentication Authorization Accounting").

This authentication step being well-known by the man skilled in the art, it won't be described here.

In a third step 3), the mobile host MN sends a request for a communication address HNP and the router MAG2 receives said request (step REQ_HNP).

In a not limited embodiment, when the proxy mobile IP protocol is used, the request is a router solicitation request RS as defined in the document RFC4861 edited by the IETF ("Internet Engineering Task Force") organization.

Said request enables the mobile host MN to ask for a communication address HNP which will allow him to communicate with a correspondent node CN across the second network NTW2 in the example taken. The request RS is sent to the router MAG2 (step TX_RS as illustrated).

It is to be noted that said request allows a mobile host MN to discover a router MAG within the second network NTW2.

In a fourth step 4), the router MAG2 creates a corresponding entry in a binding table TBCE between a home agent LMA of the home network NTWH and the mobile host MN (step CREAT_BCE).

Hence, the router MAG2 has tracked the mobile host MN attachment to the second network NTW2 and signal it to the home agent LMA.

In a not limited embodiment, when the proxy mobile IP protocol is used this step comprising the sub-steps of:
  a) The router MAG2 sends a proxy binding update request PBU(MN_ID) with the mobile host identifier MN_ID to the home agent LMA.

As the proxy binding update request PBU is received by the home agent LMA, said home agent LMA:
  assigns a second communication address HNP2 to the second network interface IF2 of the mobile host MN; and
  binds the proxy care address pCOA2 of the second router MAG2 to said second communication address HNP2.
To achieve this, it updates a binding table TBCE with a line entry comprising (as illustrated in the example in FIG. 1):
  the second communication address HNP2,
  the second proxy care of address pCOA2.
  A second reference to the second interface IF2 of the mobile host MN,
  The second access technology type used ATT2 used within said second network NTW2.

It is to be noted that the binding table TBCE has already a first line entry corresponding to the connection of the first interface IF1 of said mobile host MN to the first network NTW1, said first line entry comprising, as illustrated in the not limited example in FIG. 1:
  A first communication address HNP1,
  A first proxy care of address pCOA1 associated to the first router MAG1 of the first network NTW1,
  A reference to the first interface IF1 of the mobile host MN,
  The first technology used ATT1 within said first network NTW2.
  b) The home agent LMA sends back to the router MAG2 a proxy binding acknowledge response PBA(MN_ID, HNP, CONF) which comprises the communication address HPN2 associated to the second network NTW2 to which the mobile host MN wants to connect its second interface IF2.

Thus, this step permits the home agent LMA to know to which router MAG of which network NTW (thanks to the proxy care of address pCOA) it has to send data DAT with destination address the mobile host MN (thanks to the communication address HNP), and therefore to which interface IF (here the second interface IF2) it has to send the data DAT across said network NTW.

In the not limited embodiment where the proxy mobile IP protocol is used, a communication address HNP is a home network prefix and that a unique home network prefix (or set of prefixes) is assigned to a given interface IF of a mobile host MN.

Figure 3:
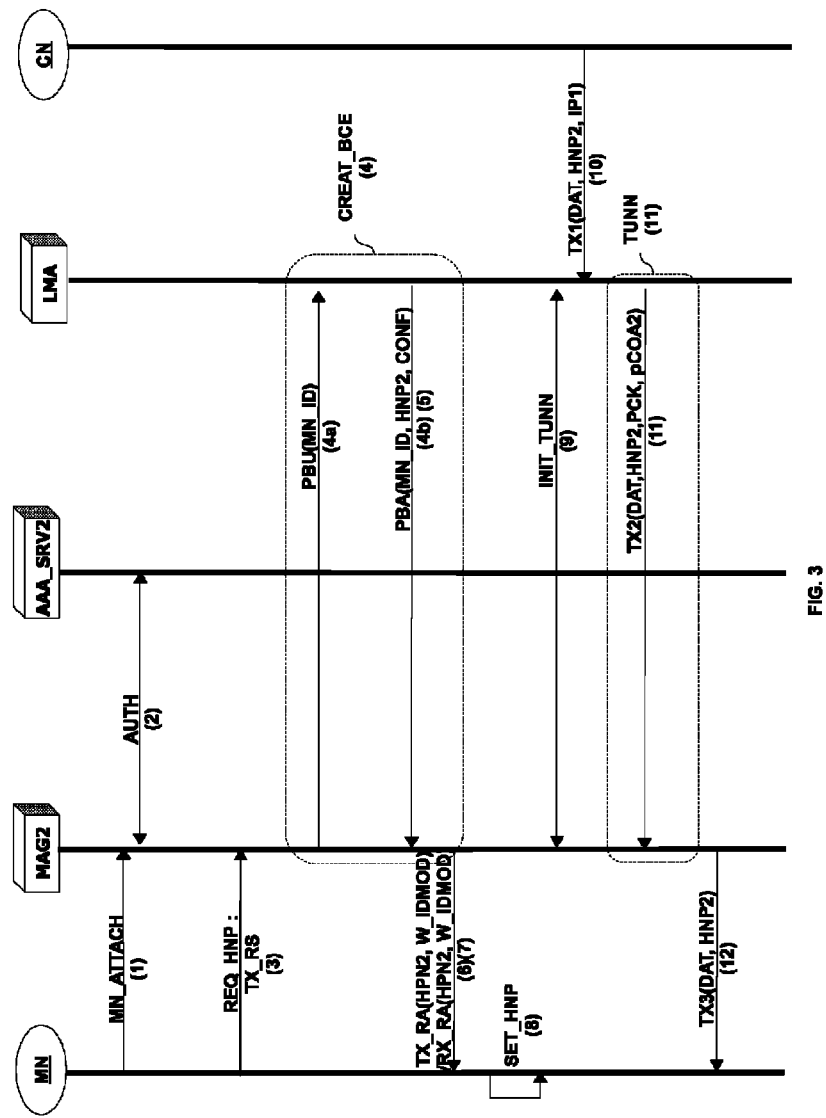
FIG. 3 illustrates schematically data exchange between a router and said mobile host of FIG. 2.

In a fifth step 5), the router MAG2 receives an instruction of configuration of said mobile host MN from a home agent LMA of the home network NTWH, said configuration enabling said mobile host MN to receive through its second network interface IF2 some data DAT sent by the correspondent node CN towards the first network interface IF1 (step PBA(MN_ID, HNP2, CONF) as illustrated in FIG. 3 and PBA(MN_ID. CONF) as illustrated in FIG. 5).

In a not limited embodiment, when the proxy mobile IP protocol is used, a proxy binding acknowledge response PBA (MN_ID, HNP, CONF) is used to instruct the router MAG2 of said configuration. Hence, the home agent LMA sends said response PBA with said instruction CONF.

In a not limited example, the some PBA response than the one used above in the previous step 4b), is used. This reduces the number of messages sent.

It is to be noted that the home agent LMA has performed a prior check of the profile (which may be acquired during the authentication step described before) of the mobile host MN in order to know if it supports multi-homing function, which means that the mobile host MN is able to receive/send data simultaneously across its different interfaces IF1, IF2. Indeed, such a configuration may be performed if multi-homing is supported.

In a sixth step 6), the router MAG2 configures said mobile host MN with a predefined model indicator W_IMOD for enabling said mobile host MN to receive through its second network interface IF2 some data DAT sent by the correspondent node CN towards the first network interface IF1 (step TX_RA(HPN2, W_IMOD) as illustrated in FIG. 3 and step TX_RA(W_IMOD) as illustrated in FIG. 5).

In a not limited embodiment, when the proxy mobile IP protocol is used, the predefined model indicator W_IMOD defines a weak host model. Such a weak host model is defined in the document RFC1122 edited by the IETF.

In a not limited embodiment, when the proxy mobile IP protocol is used, the router MAG2 uses a router advertisement request RA to perform the step of configuring said mobile host MN with said predefined model indicator W IMOD. Hence, it sends such a request RA to the mobile host MN. Such a request RA is defined in the document RFC4861 edited by the IETF. In a not limited variant of this embodiment, a bit is assigned in the RA request for the predefined model indicator, such as a bit R (Reserved; Available for assignment) within one of the bits 6 to 53. Such a bit R is described in the extension guidelines of the request RA in the RFC5175.

Upon receiving such configuration request RA, the mobile host MN is configured with said predefined model indicator W_IMOD: its second network interface IF2 is sets with said weak host model. Therefore its second network interface IF2 is now able to receive some data sent from a correspondent node CN and destined to its first interface IF1.

It is to be noted that the weak host model means that the mobile host MN will not check the address destination of data DAT it receives on its second interface IF2, and therefore will reject no data DAT, even if their address destination are different from the IP address IP2 of its second interface IF2.

In a seventh step 7), the router MAG2 transmits the communication address HNP2 to said mobile host MN and the mobile host MN receives said communication address HPN2.

In a first not limited embodiment as illustrated in FIG. 3, when the proxy mobile IP protocol is used, a router advertisement request RA is used to transmit said address communication HNP2 from said router MAG2 (sub-step TX_RA (HPN2, W_MIMOD)) to said mobile host MN (sub-step (RX_RA(HPN2, W_IMOD).

In a not limited embodiment, the step of transmitting a communication address HNP (step 6) and the step of configuring said mobile host MN (step 7) are performed altogether. In a not limited embodiment, when the proxy mobile IP protocol is used, the router MAG2 uses a router advertisement request RA to perform these two steps, as illustrated in FIG. 3.

In a second not limited embodiment as illustrated in FIG. 5, the DHCP protocol ("Dynamic Host Configuration Protocol") is used to transmit said address communication HNP2 from said router MAG2 to said mobile host MN as following. A DHCP request DHCP_Q is sent by the mobile host MN to the router MAG2, this latter forwarding said request to a DHCP server DHCP_SRV (sub-step 7a). The DHCP server DHCP_SRV sends back the communication address HNP2 saved to the router MAG2, this latter forwarding it to the mobile host MN using a DHCP response DHCP_R (sub-step 7b). As a DHCP protocol is well-known by the man skilled in the art, it won't be described here.

It is to be noted that this second embodiment may also be used when the proxy mobile IP protocol is used as illustrated in the FIG. 5. In this case, the router advertisement request RA comprises an indicator I (the M bit) telling the mobile host MN to use the DHCP protocol in order to obtain the communication address HNP2.

In a eighth step 8), upon receiving said communication address HNP2, the mobile host MN sets it with the second destination address IP2=2001::2 associated with the second network interface NTW2 (step SET_HNP).

Hence, the mobile host MN configures the communication address HNP2 to be able to send/receive some data DATA.

In an ninth step 9), the router MAG2 initializes a data tunnel TUNN between the home agent LMA and the router MAG2 of the second network NTW2 for data to be sent to the mobile host MN which connects to the second network NTW2 (step INIT_TUNN).

This data tunnel TUNN permits to transfer data DAT from the home agent LMA to the router MAG2.

Hence, when in a tenth step 10), a correspondent node CN sent some data DAT with an address destination IPDEST of the first IP address IP1=2001::1, that is to say destined to the first interface IF1 of the mobile host MN, because it wants to use the first network NTW1 (step TX1(DAT, HPN2), these data DAT are first sent to the home agent LMA of the home network NTWH to which the mobile host MN belongs.

Upon receiving such data DAT from said source destination address IPSRC=@CN, in an eleventh step 11), the home agent LMA transfers the data DAT to said second router MAG2 via the data tunnel TUNN (step TX2(DAT, HNP2, PCK, pCOA2). A tunneling on said data is applied using the proxy care of address pCOA2 of the second router MAG2. The tunneling enables to encapsulate the data DAT received from a correspondent node CN within a data packet PCK to which the proxy care of address pCOA2 is associated. To do so, the tunneling is performed using the information in the binding table TBCE.

It is to be noted that the tunneling creates a virtual home link: the mobile host MN thinks to be anchored at the home agent LMA but in reality is physically attached to the router MAG2.

It is to be noted that in this example illustrated in FIG. 3 and in FIG. 5, the home agent LMA has decided to decrease the traffic data on the first network NTW1 and therefore has decided to perform some network load balancing by sending some data destined to the firs interface IF1 of the mobile host MN (and therefore destined to be sent across the first network NTW1) on the second interface IF2 of the mobile host MN (and therefore across the second network NTW2). It is to be noted that the decision of the home agent LMA to perform some load-balancing depends on network policies of the home network NTW.

In a twelfth step 12), upon receiving said data packet PCK, the router MAG2 perform a de-tunneling and sends the data DAT to the second network interface IF2 of the mobile host MN using the associated communication address HNP2 (step TX3(DAT, HNP2)).

Hence, as the second network interface IF2 of the mobile host MN is configured in a weak host model, it will silently accept the data DAT without checking the address destination of the data sent DAT, which is the first IP address IP1=2001:1.

It is to be understood that the order of the steps above described has been mentioned and illustrated in not limited embodiments. Of course, any other orders of the steps, when applicable, may be carried out. For example, the step 9) may be carried out before the step 1) or the step 6) may be carried out before the step 5).

Figure 6:
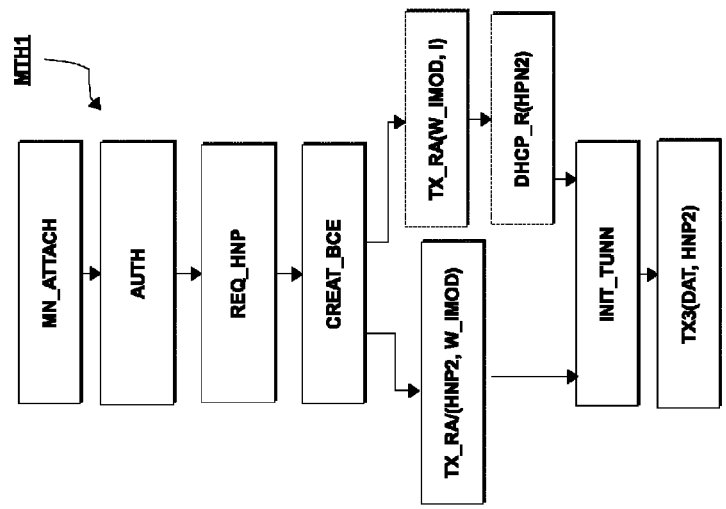
FIG. 6 is a diagram of a first method for initializing a communication, which is carried out by said router of FIG. 2 or FIG. 4.

Hence, as may be understood from above, a first method MTH1, as illustrated in FIG. 6, for initializing a communication between a mobile host MN of a home network NTWH and a correspondent node CN over at least a first and a second network NTW1. NTW2, said mobile host MN comprising at least a first and a second network interface IF1. IF2 able to connect respectively to said first and second networks NTW1. NTW2, is carried out by the router MAG2. Said first method comprises the steps of:

Attaching the mobile host MN to said second network NTW2;
Receiving a request RS for a communication address HNP;
Transmitting a communication address HNP to said mobile host MN; and
Configuring said mobile host MN with a predefined model indicator W_IMOD for enabling said mobile host MN to receive through its second network interface IF2 some data DAT sent by the correspondent node CN towards the first network interface IF1.

Figure 7:
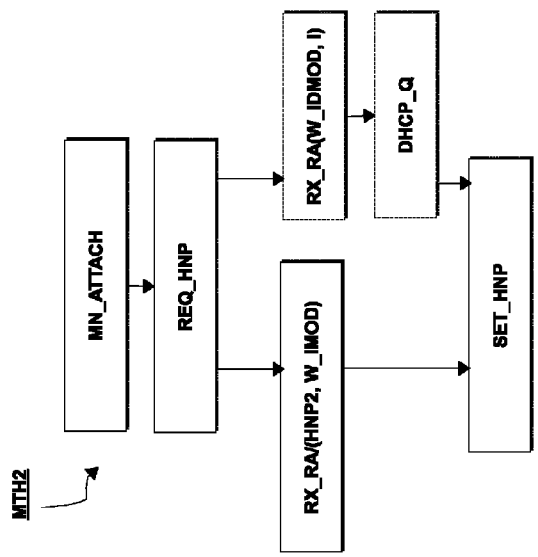
FIG. 7 is a diagram of a second method for initializing a communication, which is carried out by said mobile host of FIG. 2 or FIG. 4.

Moreover, a second method MTH2, as illustrated in FIG. 7, for initializing a communication with a correspondent node CN over at least a first and a second network NTW1. NTW2, said mobile host MN comprising at least a first and a second network interface IF1. IF2 able to connect respectively to said first and second networks NTW1. NTW2, is carried out by the mobile host MN. Said second method comprises the steps of:

Attach to said first network NTW1;
Request for a communication address HNP;
Receive a communication address HNP; and
Be configured with a predefined model indicator W_IMOD for enabling the receiving through its second network interface IF2 of some data DAT sent by the correspondent node CN towards the first network interface IF1.

It is to be noted that the second not limited embodiment where the DHCP protocol is used to sends back the communication address HNP2 to the mobile host MN is illustrated in dotted rectangles.

It is to be understood that embodiments of the present invention are not limited to the aforementioned embodiments and variations and modifications may be made without departing from the spirit and scope of the invention. In the respect, the following remarks are made.

It is to be understood that the present invention is not limited to the aforementioned application.

It may be used with any other network protocol than the PMIP protocol, which permits a configuration of a mobile host MN for enabling him to receive on one of interface some data which were not destined to said interface.

It is to be understood that the present invention is not limited to the aforementioned embodiments. Hence, for example, requests other than a route solicitation request or a route advertisement request may be used such as proprietary requests.

It is to be understood that the methods and the elements according to embodiments of the invention are not limited to any implementation. There are numerous ways of implementing functions of the first and second methods by means of items of hardware or software, or both, provided that a single item of hardware or software can carry out several functions. It does not exclude that an assembly of items of hardware or software or both carry out a function. For example, the transmitting step 4b) of a communication address may be combined with the configuring step 5) of said mobile host, thus forming a single function without modifying the initializing method in accordance with embodiments of the invention.

Said hardware or software items can be implemented in several manners, such as by means of wired electronic circuits or by means of a computer program product that is suitable programmed respectively. A first computer program product PG1 can be contained in a computer or in a router MAG. A second computer program product PG2 can be contained in a computer or in a mobile host MN. Said router MAG, and said mobile host MN each comprises a unit control as described previously, said unit control being hardware or software items as above stated.

The computer program product PG1 comprises a first set of instructions. Thus, said set of instructions contained, for example, in a computer programming memory or in a router memory, may cause the computer or the router to carry out the different steps of the first initializing method.

The computer program product PG2 comprises a second set of instructions. Thus, said set of instructions contained, for example, in a computer programming memory or in a mobile host memory, may cause the computer or the router to carry out the different steps of the second initializing method.

The set of instructions may be loaded into the programming memory by reading a data carrier such as, for example, a disk. A service provider can also make the set of instructions available via a communication network such as, for example, the Internet.

Hence, embodiments of the invention comprise the further following advantages:

It permits to perform load-balancing of data onto different interfaces of a mobile host across different networks;
It is an easy solution to implement;
It permits an automatic configuration of a mobile host during network attachment/entry;
The mobile host doesn't need clients to manage multi-homing;
It may be applied to mobile hosts which are IPV6 host, therefore which are commonly used;
It may be applied to mobile host which perform multi-homing function and therefore to mobile host commonly used;
It may be applied with the proxy mobile IP protocol; therefore from the mobile host perspective, the networks system still appears as a single link, that is to say the mobile host does not detect any change with respect to its two layer attachment even after changing its point of attachment onto another network in the networks system;
When using the proxy mobile IP protocol, it may use the requests already used within said proxy mobile IP. In this case, no proprietary request needs to be implemented.

Any reference sign in the following claims should not be construed as limiting the claim. It will be obvious that the verb to "comprise" and its conjugations do not exclude the presence of any other steps or elements beside those defined in any claim. The word "a" or "an" preceding an element or step does not exclude the presence of a plurality of such elements or steps.

The invention claimed is:

1. A router able to cooperate with a mobile host of a home network for initializing a communication between said mobile host and a correspondent node over at least a first and a second networks using a first communication address and a second communication address for a first network interface and a second network interface, respectively, said mobile host comprising at least the first and a second network interfaces, which connect respectively to said first and second networks, said router being configured to:
attach the mobile host to said second network;
receive a request for a communication address;
transmit the second communication address to said mobile host for assignment to the second network interface; and
configure said mobile host with a predefined model indicator that automatically enables said mobile host to receive through the second network interface some data sent by the correspondent node towards the first network interface using a data address destination, wherein the predefined model indicator indicates to the mobile host to refrain from checking the data address destination;
wherein the router is further configured to receive an instruction of configuration of said mobile host from a home agent of the home network;
create a corresponding entry in a binding table between a home agent of the home network and the mobile host; and
transmit a communication address and configure said mobile host altogether.

2. A router according to claim 1, wherein the router uses a proxy mobile IP protocol.

3. A router according to claim 2, wherein the router is a mobility access gateway and the home agent with which the router cooperates is a local mobility anchor.

4. A router according to claim 2, wherein the predefined model indicator defines a weak host model.

5. A router according to claim 2, wherein the router uses a router advertisement request to configure said mobile host with a predefined model indicator.

6. A networks system for initializing a communication between a mobile host of a home network and a correspondent node over at least a first and a second networks by way of a router, said mobile host comprising at least a first and a second network interfaces able to connect respectively to said first and second networks, said networks system comprising:

a router according to claim 1; and a mobile host operative to attach to said second network, request for a communication address, receive a communication address, and be configured with a predefined model indicator for enabling the the mobile host to receive through the second network interface some data sent by the correspondent node towards the first network interface using a data address destination, wherein the predefined model indicator indicates to the mobile host to refrain from checking the data address destination.

7. A mobile host of a home network able to cooperate with a router for initializing a communication with a correspondent node over at least a first and a second networks using a first communication address and a second communication address for a first network interface and a second network interface, respectively, said mobile host comprising at least the first and a second network interfaces, which connect respectively to said first and second networks, said mobile host being configured to:

attach to said second network;

request for a communication address;

receive the second communication address for assignment to the second network interface; and receive a predefined model indicator that configures the mobile host and automatically enables the the mobile host to receive through the second network interface some data sent by the correspondent node towards the first network interface using a data address destination, wherein the predefined model indicator indicates to the mobile host to refrain from checking the data address destination;

wherein the mobile host is further configured to provide an instruction of configuration of said mobile host via a home agent of the home network; and receive a communication address via which said mobile host is configured.

8. A mobile host according to claim 7, wherein the mobile host is further configured to set up said communication address with a second destination address associated with the second network interface.

9. A mobile host according to claim 7, wherein it the mobile host uses a proxy mobile IP protocol.

10. A mobile host according to claim 9, wherein the predefined model indicator defines a weak host model.

11. A method for initializing a communication between a mobile host of a home network and a correspondent node over at least a first and a second networks using a first communication address and a second communication address for a first network interface and a second network interface, respectively, said mobile host comprising at least the first and a second network interfaces, which connect respectively to said first and second networks, said method comprising:

attaching the mobile host to said second network;

receiving a request for a communication address;

transmitting the second communication address to said mobile host for assignment to the second network interface; and configuring said mobile host with a predefined model indicator that automatically enables said mobile host to receive through the second network interface some data sent by the correspondent node towards the first network interface using a data address destination, wherein the predefined model indicator indicates to the mobile host to refrain from checking the data address destination;

receiving an instruction of configuration of said mobile host from a home agent of the home network;

creating a corresponding entry in a binding table between a home agent of the home network and the mobile host; and transmitting a communication address and configure said mobile host altogether.

12. A non-transitory computer program product for a computer, comprising a set of instructions, which when loaded into said computer, causes the computer to carry out the method according to claim 11.

13. A method for initializing a communication from a mobile host of a home network with a correspondent node over at least a first and a second networks using a first communication address and a second communication address for a first network interface and a second network interface, respectively, said mobile host comprising at least the first and a second network interfaces, which connect respectively to said first and second networks, said method comprising:

attaching to said first network;

requesting for a communication address;

receiving the second communication address for assignment to the second network interface; and the mobile host being configured with a predefined model indicator that automatically enables the receiving through the second network interface of some data sent by the correspondent node towards the first network interface using a data address destination, wherein the predefined model indicator indicates to the mobile host to refrain from checking the data address destination;

providing an instruction of configuration of said mobile host via a home agent of the home network; and receiving a communication address via which said mobile host is configured.

14. A non-transitory computer program product for a computer, comprising a set of instructions, which when loaded into said computer, causes the computer to carry out the method according to claim 13.

\* \* \* \* \*